United States Patent [19]
Meister

[11] 3,769,719
[45] Nov. 6, 1973

[54] TEACHING SYSTEM FOR KEYBOARD DEVICES

[75] Inventor: Jack B. Meister, Convent Station, N.J.

[73] Assignee: Integrated Electronics Corp., Dover, N.J.

[22] Filed: Jan. 10, 1972

[21] Appl. No.: 216,581

[52] U.S. Cl. .................................... 35/6, 35/9 E
[51] Int. Cl. ............................................ G09b 3/00
[58] Field of Search.................... 35/5, 6, 9 R, 9 A, 35/9 E, 8 R

[56] References Cited
UNITED STATES PATENTS
| | | | |
|---|---|---|---|
| 3,221,418 | 12/1965 | Hoernes et al. | 35/9 A |
| 3,166,856 | 1/1965 | Uttal | 35/6 |
| 3,423,845 | 1/1969 | Edge et al. | 35/6 |

FOREIGN PATENTS OR APPLICATIONS
| | | | |
|---|---|---|---|
| 1,170,446 | 11/1969 | Great Britain | 35/5 |

Primary Examiner—Robert W. Michell
Assistant Examiner—J. H. Wolff
Attorney—Lawrence I. Lerner et al.

[57] ABSTRACT

A system is disclosed in which a keyboard operated device such as a typewriter is simulated for training purposes by providing a keyboard on which a prearranged sequence of alphanumeric characters are to be typed. Information relating to the prearranged sequence is stored on a piece of paper tape in a paper tape reader and is also presented on a sheet of paper inserted in the device. A covering means having a window therein is employed to cover the typed material. As the correct sequence is typed on the keyboard, the window advances incrementally one space at a time after a comparison is made between the information stored on the paper tape and the typed character. If a match is not made therebetween, the keyboard is inhibited so that the student cannot proceed further. When the window reaches the end of the line, the covering means is reset to recover the typed line and the paper upon which the alphanumeric information is present is advanced so that the line previously incrementally uncovered is moved out of the field of the covering means.

3 Claims, 2 Drawing Figures

PATENTED NOV 6 1973    3,769,719

TEACHING SYSTEM FOR KEYBOARD DEVICES

FIELD OF THE INVENTION

This invention relates to a teaching machine and particularly to machines for teaching the operation of various keyboard devices.

BACKGROUND OF THE INVENTION

Many machines such as computer input terminals and typewriters are operated by manipulation of a keyboard.

The cost of such machines resides primarily in mechanisms other than the keyboard. As the machines become more and more expensive, it becomes less and less practical to utilize an actual machine for training purposes.

U.S. Pat. No. 3,601,905 teaches the use of a mock display panel for a general purpose computer for teaching the operation and manipulation thereof. The computer responds to inputs applied thereto by the lighting of lights in particular locations on the display panel. The above referred to U.S. patent teaches one to compare a stored sequence of operations to manually entered manipulations by the trainee to light the predetermined pattern of lights if the trainee enters the proper manual information at the appropriate input points.

This system is quite effective for teaching the operation of computers and other devices of the like in which the machine responds to the operator by the production of patterns of light. Many machines, however, respond to manual manipulation or electronic inputs by typing words and/or letters on paper. The system taught in the above mentioned U.S. patent application cannot fill this need.

BRIEF DESCRIPTION OF THE INVENTION

In accordance with the teachings of this invention a system of simulating the operation of a machine which produces a display in response to stimuli applied thereto is provided. The machine includes a support for holding a prearranged display in a first viewing position; a mask for covering the prearranged display in the first viewing position, the mask being responsive to an advance signal for incrementally uncovering the prearranged display; a keyboard responsive to manipulation thereof for providing an information signal and circuitry for comparing the information signal with the next covered increment of the prearranged display for providing the advance signal.

In one embodiment of this invention the machine to be simulated produces a multi-character alphanumeric display one character at a time and the mask is responsive to the advance signal to uncover one character.

In the preferred embodiment the support means is responsive to a reset signal for moving a portion of the prearranged display into a second viewing position and the mask is also responsive to the reset signal for recovering the first viewing position. In this way the line of alpha-numeric information previously uncovered one character at a time is held in an uncovered viewing position while the next line can be incrementally uncovered one character at a time simulating the operation of a typewriter type machine.

DESCRIPTION OF THE DRAWINGS

A more complete understanding of the invention can be had by reference to the attached drawings in which.

DETAILED DESCRIPTION OF THE DRAWINGS

Figure 1:
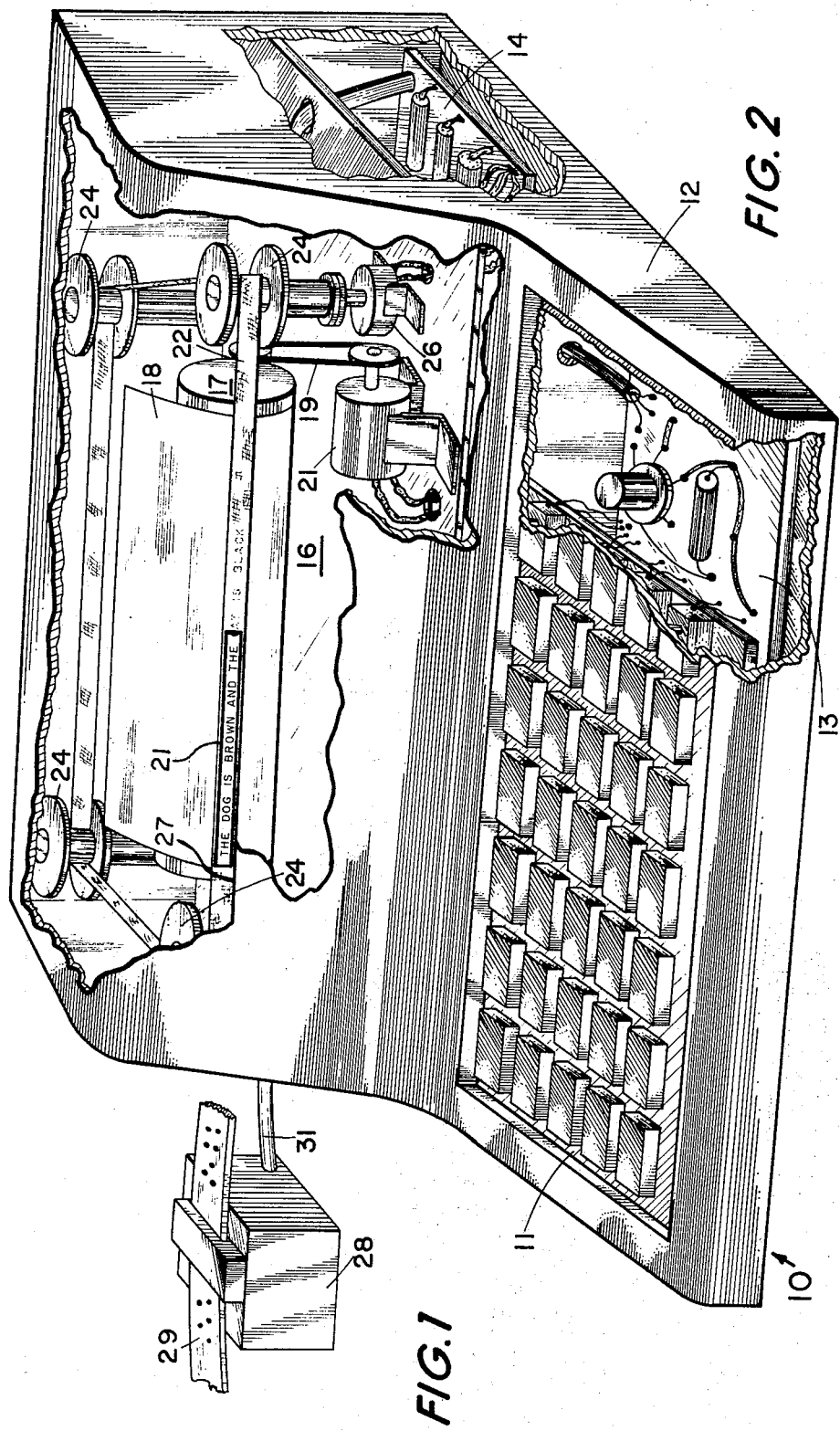
FIG. 1 is an isometric cutaway view of a system embodying the principles of this invention.

Referring now to FIG. 1 we see a machine 10 having a keyboard 11 for simulating the operation of a keyboard type device such as a computer input terminal. A support structure 12 holds the keyboard 11, the keyboard circuitry 13, comparison logic circuitry 14 and a printing simulating assembly 16.

The printing simulating assembly 16 includes a roller 17 for holding a prearranged display typically typed on a piece of paper 18. The roller 17 is connected by a belt 19 to a permanent message drive motor 21. A continuous mask 22 having a slotted portion or window 23 is mounted on guide rollers 24. One of the guide rollers is driven by an exposure window drive motor 26.

The window 23 in the mask 22 extends along a portion thereof at least as long as the longest display to be uncovered. The bottom portion of the mask 22 abuts a portion 27 of the support structure 12 so that anything below the mask 22 is not visible. The window 23 is positioned adjacent to the top of the mask 22 so that that portions of the paper 18 above the mask can be freely viewed. The width of the mask above the window 23 should be at least as narrow as the space between lines of any display to be viewed.

A punched tape reader 28 is employed for reading a stored input on a piece of punched tape 29 and applying it to the comparison logic circuitry 14 by a cable 31.

Figure 2:
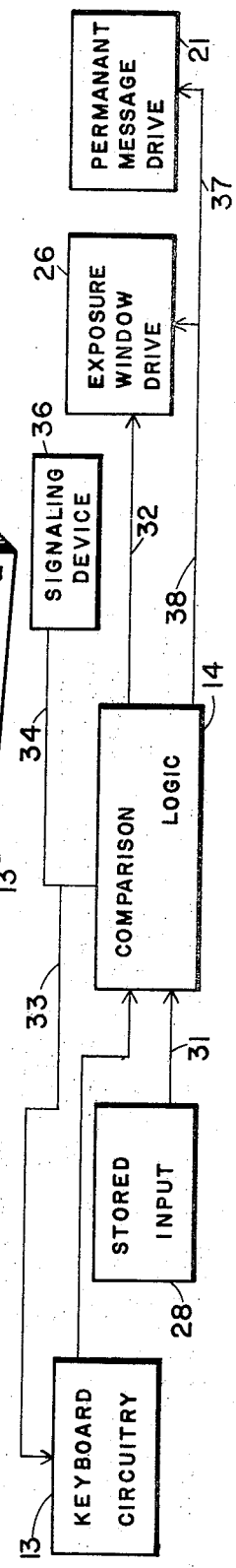
FIG. 2 is a logical block diagram showing the system function of the system of FIG. 1.

Referring now to FIGS. 1 and 2 together we see that the machine 10 is operated by providing a trainee with a sequence of symbols to be typed or entered through typing into a computer. The trainee types one letter at a time on the keyboard 11. The keyboard circuitry 13 provides a signal in response to each actuation of a key on the keyboard 11 to the comparison logic 14. The information stored in the paper tape reader 28 is applied as a second input to the comparison logic 14. If a comparison is found, a signal is applied from the comparison logic 14 by a lead 32 to drive the exposure window drive 26 one increment. This increment is chosen to be one-character space on the paper 18. The incrementing of the exposure window drive 26 rotates the guide rollers 24 to move the mask 22 in a counterclockwise direction so that the window 23 exposes one additional character or space on the paper 18.

If a mismatch is sensed by the comparison logic circuitry 14, an error lockout signal is provided to the keyboard by lead 33 which inhibits operation of any key on the keyboard 11. Additionally, the error lockout signal can be provided by the lead 34 to a signaling device 36 to visually or audibly inform the trainee that an error has been committed. In this way a trainee can be conditioned to apply appropriate sequences to the keyboard 11 with the display provided on the paper 18 being visible in a way to simulate what would actually happen if the keyboard of an actual machine being simulated were manipulated in the same fashion. This is done without the necessity of having the more expensive mechanisms of the sophisticated machinery being simulated.

When the window 23 has reached the end of a line or else when a carriage return key on the keyboard 11 is depressed a signal is applied by the comparison logic 14 via lead 37 to the permanent message drive 21. The signal on the lead 37 increments the permanent message drive 21 to move the line just uncovered by the window 23 above the mask 22 to be visible without regard to the positioning of the mask 22. The reset signal on the lead 37 is applied via lead 38 to also actuate the exposure window drive 26 to rewind the mask 22 in a clockwise direction recovering the information therebeneath on the paper 18. In this way the actual display provided by a typewriter type machine is simulated. Lines previously typed are brought above the mask 22 and are thereafter visible. Each line, however, is first incrementally exposed as the appropriate keys on the keyboard 11 are depressed. When the carriage return is depressed or the end of the line is reached, the mask 22 recovers the paper 18 while the line previously uncovered is brought above the mask 22 for continuous viewing.

It should be understood that the principles taught by this invention may be practiced in ways other than the specific embodiment disclosed herein. For example, the keyboard 11 can provide a pattern of lights as an output signal rather than electrical signals. This pattern of lights can be applied directly to the paper tape 29 so that a set of photocells mounted therebehind can serve as the comparison logic 14. In this way a simple system for comparing the keyboard signal with the storage signal is accomplished.

It should be understood that while this invention has been disclosed with respect to two embodiments thereof, numerous others will become obvious to those of ordinary skill in the art in light thereof.

What is claimed is:

1. A device for simulating the operation of a machine which produces a display, said device including:
   first means for holding a prearranged multi-character display in a position;
   second means for covering said prearranged display;
   third means for mounting said first and second means with said covering means covering said position; said third means being responsive to an advance signal for producing a predetermined relative movement between said first and second means to selectively uncover a predetermined portion of said position; said predetermined portion being representative of a single character of said multi-character display
   a multi-key keyboard having means for providing an information signal in response to one of said keys being depressed said signal being indicative of which of said keys is depressed;
   fourth means for storing and presenting a stored signal indicative of a next key to be depressed; and
   fifth means responsive to correspondence between said information signal and said stored signal for providing said advance signal.

2. The device as defined in claim 1 in which said first means is responsive to a reset signal for moving a portion of said prearranged display into a further position and said third means is also responsive to said reset signal for covering said position.

3. The system as defined in claim 1 in which said fourth means includes a paper tape reader.

* * * * *